United States Patent [19]

Chou et al.

[11] Patent Number: 4,868,651
[45] Date of Patent: Sep. 19, 1989

[54] DIGITAL RADIOGRAPHY WITH IMAGE BRIGHTNESS AND CONTRAST NORMALIZATION

[75] Inventors: Tzeyang J. Chou, Fayetteville; Marshall Ma, Baldwinsville; Ralph Flatau, East Syracuse; Fred Elderbroom, Cicero, all of N.Y.

[73] Assignee: S&S Inficon, Inc., Liverpool, N.Y.

[21] Appl. No.: 195,023

[22] Filed: May 17, 1988

[51] Int. Cl.$^4$ ............................................. H04N 5/32
[52] U.S. Cl. .................................... 358/111; 378/99
[58] Field of Search ............... 378/99; 358/111, 282, 358/80, 257

[56] References Cited

U.S. PATENT DOCUMENTS

| | | | |
|---|---|---|---|
| 3,983,320 | 10/1976 | Ketcham et al. | 358/166 |
| 3,988,602 | 3/1976 | Gorsica, Jr. | 235/150.1 |
| 4,214,271 | 8/1980 | Jones et al. | 358/166 |
| 4,337,514 | 6/1982 | Faurean et al. | 358/166 |
| 4,353,092 | 10/1982 | Bailey et al. | 358/166 |
| 4,365,304 | 7/1982 | Ruhman et al. | 358/166 |
| 4,394,744 | 4/1983 | Wrench, Jr. | 358/166 |
| 4,395,732 | 7/1983 | Upton | 358/166 |
| 4,403,253 | 2/1983 | Morris et al. | 358/160 |
| 4,408,233 | 6/1983 | Nahon et al. | 358/284 |
| 4,445,138 | 1/1984 | Zwirn et al. | 358/166 |
| 4,450,482 | 9/1984 | Ackermann | 358/160 |
| 4,499,486 | 11/1985 | Favreau et al. | 358/37 |
| 4,534,059 | 2/1985 | Yamada | 382/54 |
| 4,538,227 | 8/1985 | Toraichi et al. | 358/111 |
| 4,590,606 | 8/1986 | Rohrer | 382/7 |
| 4,639,769 | 7/1987 | Fleisher et al. | 358/27 |
| 4,667,238 | 1/1987 | Zwirn | 358/166 |
| 4,680,628 | 7/1987 | Wojcik et al. | 378/99 |
| 4,730,212 | 3/1988 | Wojcik et al. | 378/99 |
| 4,789,831 | 12/1988 | Mayo, Jr. | 358/82 |

OTHER PUBLICATIONS

Digital Image Processing and Analysis, Jean Claude Simon and Azriel Rosenfeld, Series E: Applied Science—No. 20.
Smoothed Histogram Modification for Image Processing, Kautsky, Nicholas and Jupp, 271-291.
Image Enhancement by Histogram Hyperbolization, Frei, pp. 287-295.
Image Enhancement by Histogram Transformation, Robert Hummel, 184-195.

Primary Examiner—Craig E. Church
Assistant Examiner—John C. Freeman
Attorney, Agent, or Firm—Wall and Roehrig

[57] ABSTRACT

A process for enhancing a still video image can correct digital fluoroscopy images which are under- or overexposed and have their image brightness values concentrated to one end of the gray scale. A pixel histogram is formed, but is clipped at a low value. Then, a cumulative histogram is formed from the clipped histogram. The cumulative histogram, which has a generally linear slope, is normalized and is used for mapping the brightness of luminance values of the original image. The new values form an optimal video image with the gray scale values spread over the entire range. The image shows details not only in the middle gray areas, but in the light and dark areas as well.

5 Claims, 6 Drawing Sheets

DIGITAL RADIOGRAPHY WITH IMAGE BRIGHTNESS AND CONTRAST NORMALIZATION

BACKGROUND OF THE INVENTION

This invention relates to image enhancement techniques, and especially to image enhancement by histogram modification. More specifically, the invention is directed to histogram modification of a still video picture which technique can be applied to advantage in medical or veterinary use, to-wit, in digital computerized fluoroscopy or the like.

The field of digital video radiography has recently received much attention as a clinical procedure, particularly for its advantages over the traditional silver-halide film techniques. The new techniques include digital subtraction angiography and digital computerized fluoroscopy. In both of these techniques a low-power x-ray tube radiates through a patient's body tissues to a phosphor plate or other image producing device, usually forming a part of an image intensifier. A high-resolution video camera is focused at the image formed by the image intensifier. The camera produces a still picture signal which is digitized and stored in a computer memory. Subtraction radiography employs a similar procedure, but a second exposure is taken and the difference values of the two resulting still images are stored and processed.

There are at least two problem areas that must be addressed by digital video radiography, namely, optimizing image spatial resolution and contrast quality, and reducing x-ray exposure to the patient and to the radiologist.

The problem of poor image quality and loss of low-contrast detail had to be solved to reduce or eliminate the need for retaking of images. Ideally, the images taken should be corrected and enhanced to show the necessary tissue detail, so that a patient need not be re-exposed to radiation. Also, the ability to reliably produce ideal video images, and to eliminate the need to retake radiographs, frees the equipment and radiology personnel for radiography on other patients.

One possible means to effect suitable image enhancement is with so-called histogram equalization. In this technique, the digitized video signal is stored in the form of luminance or brightness values for respective image pixels (picture elements). In the video pictures, the pixels are arrayed in a tableau. Each luminance value corresponds to a gray scale value from zero (black) to a maximum brightness (white). In a poor-quality picture, the values are all concentrated in one part of the gray scale. For a severely underexposed video picture, for example, most of the pixels will have low luminance values with little difference from one to another. This yields a picture with little visibility of detail. The objective of histogram equalization is to provide a transfer function on which the original digital video luminance values can be mapped to yield corresponding new values that extend over the entire gray scale, and thereby increase the contrast and image clarity.

The histogram equalization enhancement technique accumulates and tabulates the number of pixels of each gray scale level. A cumulative histogram is formed which accumulates the total of all pixels having a given gray scale value or below. This produces a monotonic-increasing transfer function which has a higher slope where there are more occurrences of gray scale information and a flat or low slope where there are few occurrences.

Histogram equalization techniques are described in Robert Hummel, "Image Enhancement by Histogram Transformation", Computer Graphics and Image Processing, Vol. 6, No. 2, 184–195, 1977; Jean Claude Simon and Azriel Rosenfeld, "Digital Image Processing and Analysis", Nato Advanced Study Series, Ser. E, No. 20, 47–53, 1977; J. Kautsky, N. Nichols and D. L. B. Jupp, "Smoothed Histogram Modification for Image Processing", Computer Graphics and Image Processing, Vol. 26, No. 3 271–291, June 1984; W. Frei, "Image Enhancement by Histogram Hyperbolization", Computer Graphics and Image Processing, Vol. 6, No. 3, 286–294, 1977; and U.S. Pat. Nos. 3,983,320; 4,365,304; and 4,445,138.

In these techniques, there is good contrast in the resulting picture, but there is a tendency to emphasize the center gray scale levels. The mapping is non-linear which tends to distort the original image's contrast relation, and very light or very dark areas lose emphasis. These low contrast areas, which are the high interest areas in many radiographs, often lack sufficient detail for reliable diagnosis.

OBJECTS AND SUMMARY OF THE INVENTION

It is an object of this invention to provide a still picture video enhancement technique which overcomes the drawbacks of prior art techniques, and which is highly suitable for use in digital video radiography.

It is another object of this invention to provide an image enhancement technique which produces a linear mapping of equal amount enhancement over the entire gray scale, resulting in good contrast and with superior detail contrast resolution even in very light or very dark picture areas.

It is a further object of this invention to provide an image enhancement technique that permits radiograph pictures to be restored from poor quality original video images, to minimize the need for re-exposing the patient to radiation and to free up the equipment for use with other patients.

In accordance with an aspect of this invention, a still video image is enhanced to achieve ideal contrast and brightness. The video image is divided into a tableau of pixels or picture elements, each with a respective brightness or luminance value along a gray scale from zero (black) to a predetermined maximum (saturated or white). The pixel luminance values are digitized to respective digital values in a range from zero to a predetermined maximum value (i.e., 255), and a "clipped" histogram distribution is formed across the 256 digital brightness values. This is done by storing, for each possible brightness or luminance value from zero to the maximum digital value (255), a number equal to the number of pixels having that value up to a predetermined finite low threshold number. If there are more than that number of pixels at that luminance value, the threshold number is stored. Then, a cumulative histogram is formed from the clipped histogram distribution by storing for each of the possible pixel digital values the sum of the stored numbers of pixels having values up to and equal the respective digital value. This yields a substantially linear transfer function for mapping the original gray scale values of each pixel into new gray scale values. The cumulative histogram is normalized by an appropriate factor such that the stored pixel sum equals the total number of pixels of the image. Then, new digital luminance values are assigned for each of the pixels by mapping the respective original digital luminance values thereof onto the normalized cumulative histogram. These new values are used in reproducing a visible image. The reproduced image has an optimal luminance distribution over the entire gray scale, and has overall high contrast and superior detail contrast resolution in the bright and dark regions, as well as the middle gray values of the reproduced image.

In a preferable application, this technique is used in connection with digital video fluoroscopy, and the still video image is produced by a video camera in connection with an image intensifier that is responsive to x-rays. The image enhancing technique can reduce the risk of repeated exposure to x-rays by utilizing only one exposure for each area of interest which may otherwise b of quite poor quality. This makes retakes unnecessary, which reduces the total x-ray dosage for each patient, and reduces the time required for each patient on the equipment.

The above and many other objects, features, and advantages of this invention will be more fully understood from the ensuing detailed description of the preferred embodiment, which is to be considered in connection with the accompanying Drawing.

DETAILED DESCRIPTION OF A PREFERRED EMBODIMENT

Figure 1:
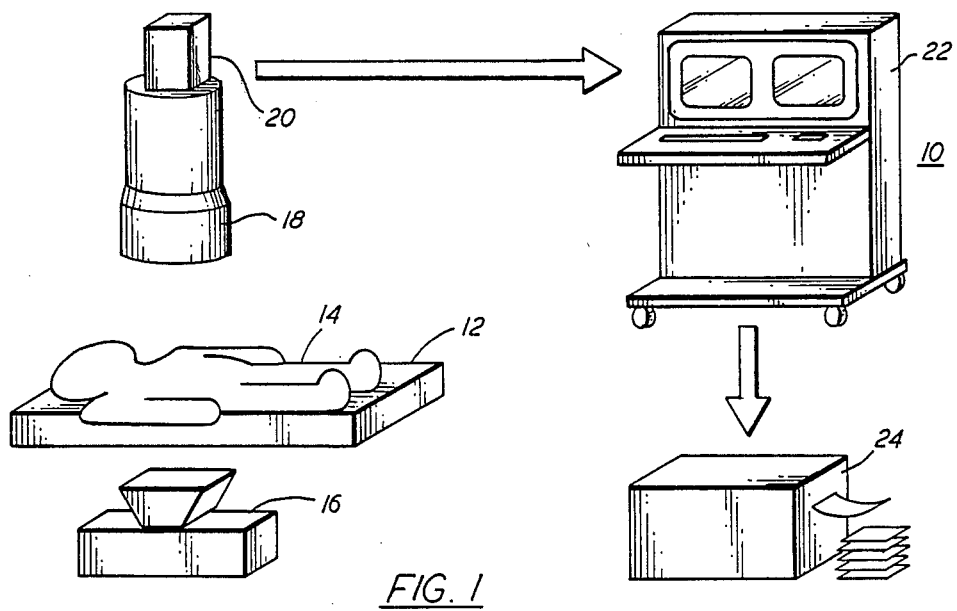
FIG. 1 is a schematic view of a computerized digital video fluoroscopic imaging arrangement which incorporates the features of this invention.

With reference to FIG. 1, a video imaging digital fluoroscope has a horizontal stage or table 12 on which a human patient 14 rests. An x-ray tube 16 beneath the table 12 transmits x-rays through the body tissues of the patient 14 to fall on an image intensifier 18. The latter produces a fluorescent image. A video camera 20 is aimed at the image and produces a video signal that is fed to a fluoroscopic imaging computer 22. The video signal is then processed in the computer 22 to correct the image i.e. to obtain a picture with good contrast and brightness, and to make full use of the range of gray scale values. The corrected video signal is sent to a multi-format camera 24 which produces high resolution, hard-copy radiograph prints. These prints can be positive, but are usually produced as negatives because negatives conform with the film radiograph images traditionally used by radiologists.

Figure 2:
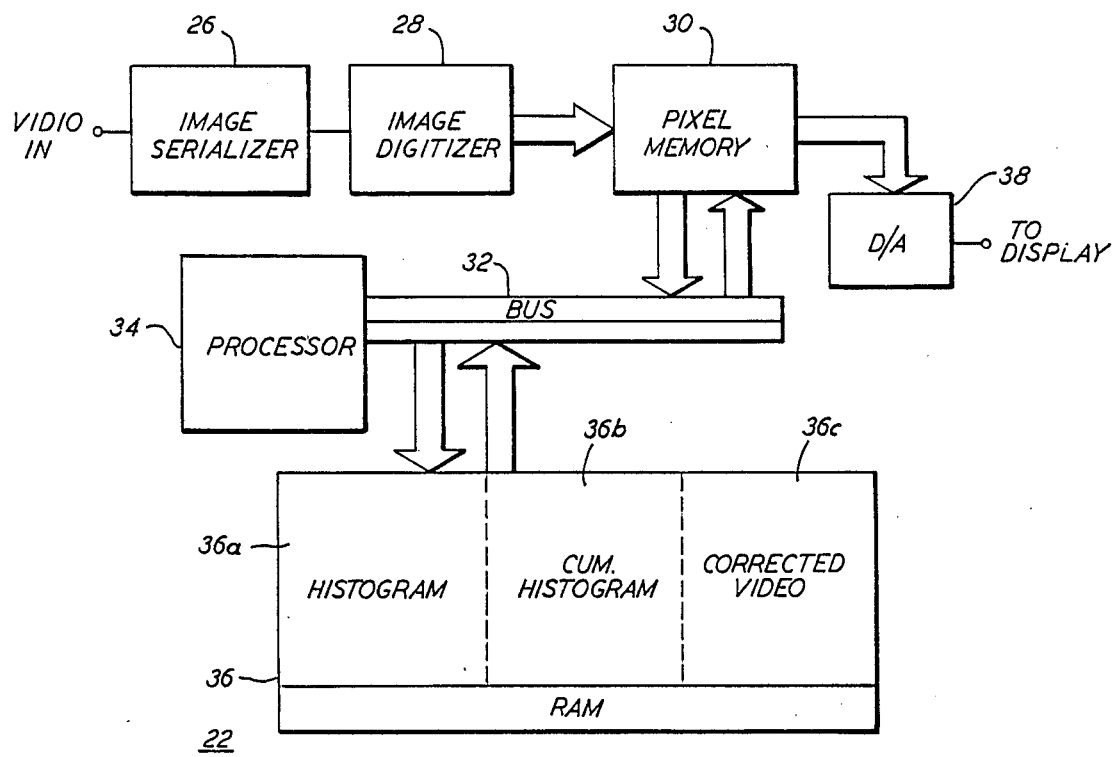
FIG. 2 is a partial process diagram for explaining the improvement features of this invention.

The circuitry within the fluoroscopic imaging computer 22, as illustrated in part in FIG. 2, contains an image serializer which divides the analog video input signal into a series of pixels, and an image digitizer, which converts the pixel luminance information into digital form to be stored in a pixel memory 30. A data bus 32 connects the pixel memory 30 to a suitably-programmed processor 34 and to a computer memory 36. The latter can be considered to have compartments or memory areas such as an area 36a for storing a clipped histogram, an area 36b for storing cumulative histogram data, and an area 36c for storing corrected video data. The corrected video data is fed back through the bus 32 to the pixel memory 30 and through a digital/analog converter 38 to a display on the computer 22 or to the camera 24.

The operation of this fluoroscope 10 can be explained with reference to FIGS. 3-12, and first explaining a technique of histogram image enhancement, according to the prior art.

Figure 3:
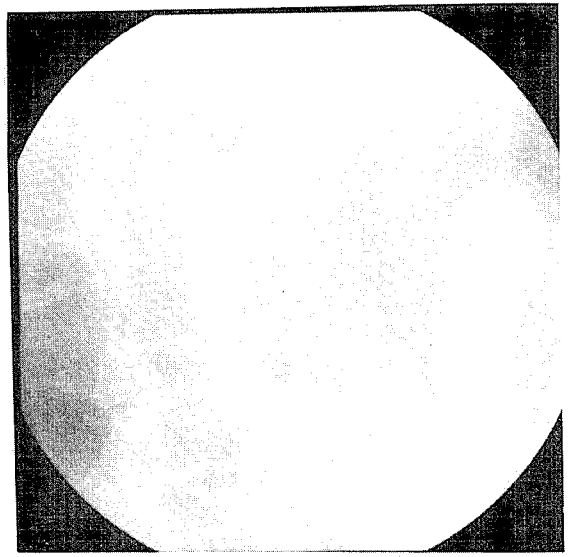
FIG. 3 shows a direct video still image which is to be enhanced in accordance with the principles of this invention.

An exemplary raw image video still picture image is shown in FIG. 3. In this case, the image is severely underexposed, and all of the picture elements have luminance or brightness values at the low end of the gray scale. While some sharp edges are discernable, most of the fine detail is completely lost to the eye.

A prior art histogram equalization technique will provide considerable improvement to this image, but this technique does not maintain the original image's contrast relationship and therefore, does not achieve optimum detail resolution for radiographs. The prior art technique is described with reference to FIGS. 4-7 so as to underscore the advantages of this invention.

Figure 7:
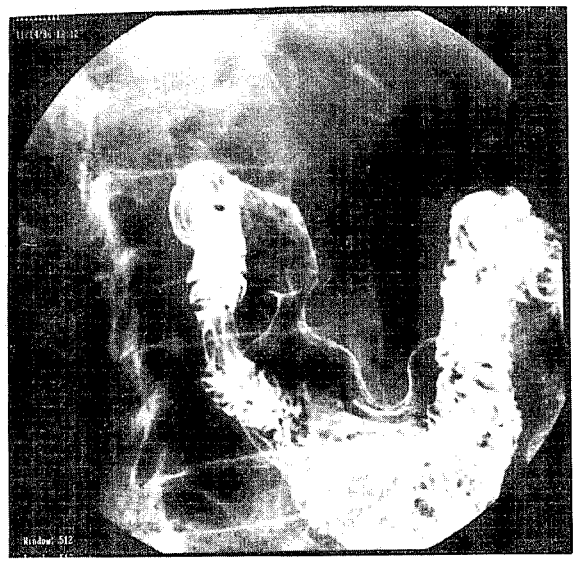
FIG. 7 shows an enhanced reproduced video image according to the prior art.
Figure 12:
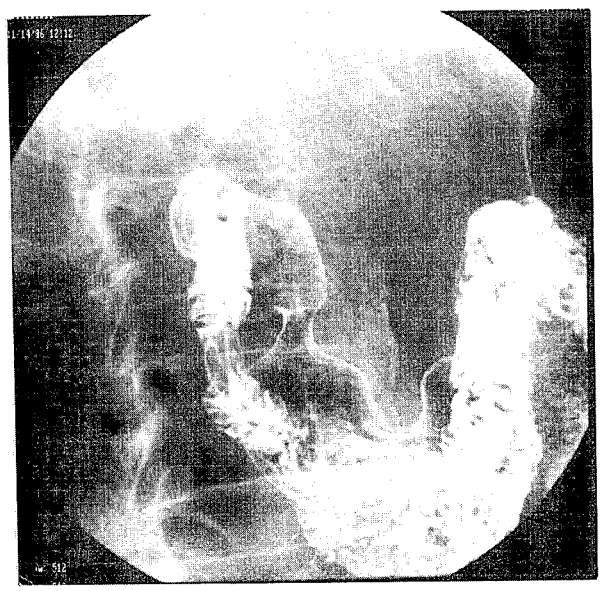
FIG. 12 shows a reproduced digital video image corrected for optimal contrast and brightness according to the techniques of this invention.
Figure 4:
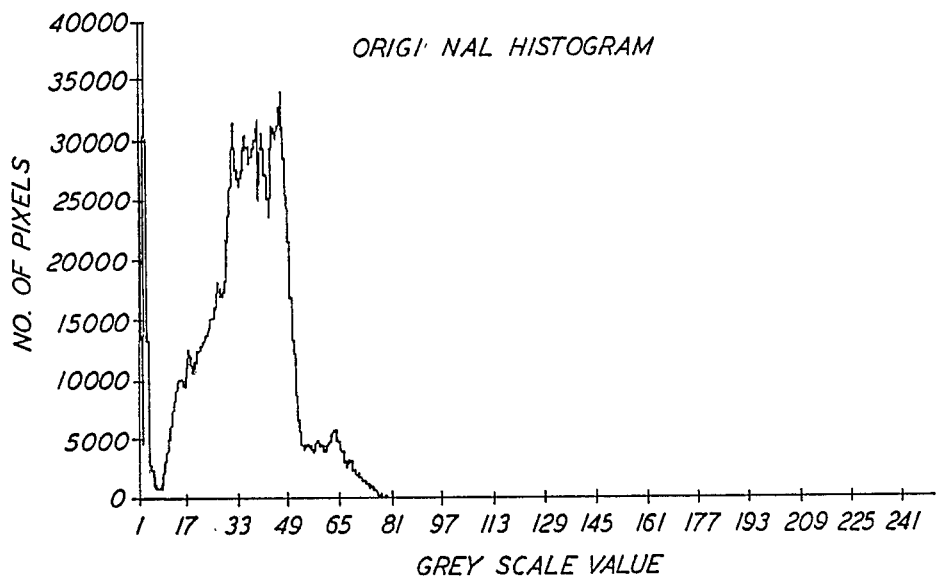
FIGS. 4-6 are graphs for explaining the enhancement feature according to the prior art.
Figure 5:
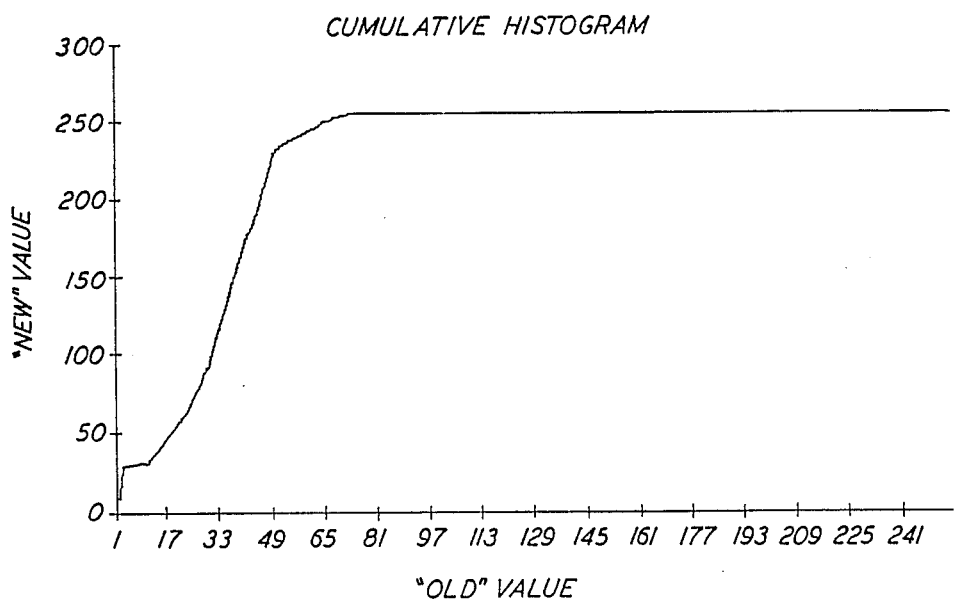
Figure 6:
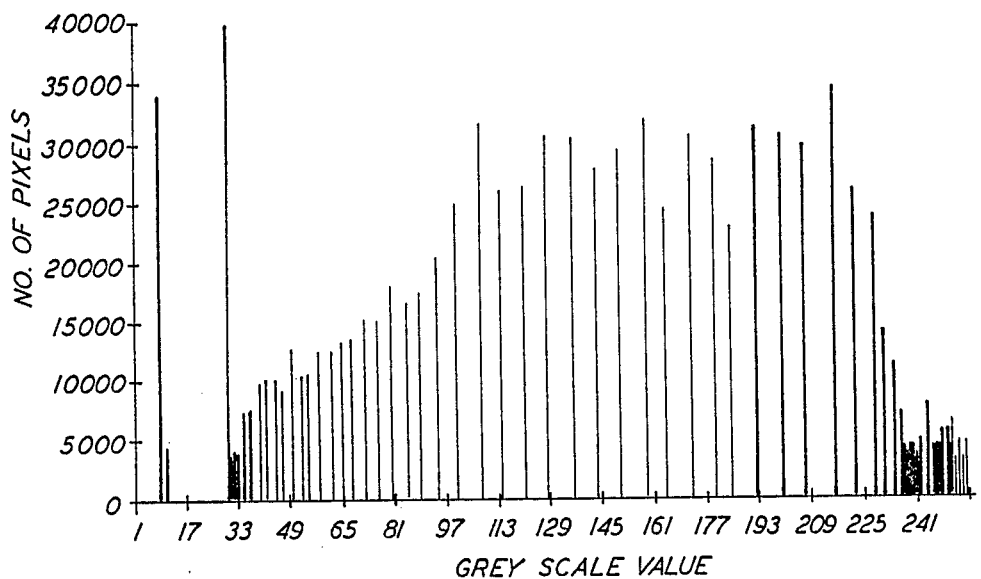

In FIG. 4 there is illustrated a histogram which represents the number of picture elements at each digital brightness value from zero to a maximum of 255. There are a large number of pixels at zero or other very low values, and most of the information is concentrated at the very low end of the gray scale. According to this known technique, a cumulative histogram is formed, as shown in FIG. 5, as a monotonically increasing curve. The cumulative histogram is simply a graph of the sums of the number of pixels having digital luminance values equal to or less than the plotted value on the abscissa. This cumulative histogram of FIG. 5 is then used as a transfer function wherein the old digital value for each pixel is mapped by the cumulative histogram to yield a new digital value. This produces a more-or-less even gray scale distribution, and the new or mapped digital luminance values have a histogram distribution as illustrated, for example, in FIG. 6. These new digital values are then used to produce a reproduced video still image, as shown in FIG. 7, which corrects many of the defects in the original picture (FIG. 3) with good contrast and with good highlights at the mid values of the gray scale. However, this nonlinear mapping distorts the original image's contrast relationship which results in poor detail resolution in the very bright and very dark areas, which are often the very areas of most interest in diagnosis.

Figure 8:
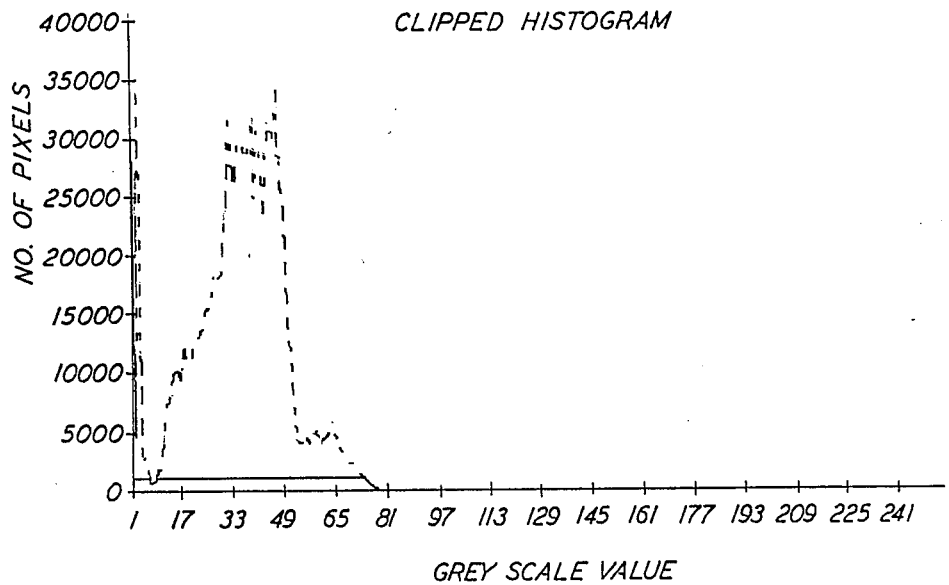
FIGS. 8-11 are charts for explaining the digital video enhancement technique according to the present invention.

The operation of the present invention can be explained with reference to FIGS. 8-11. Here, the digital values corresponding to the pixels of FIG. 3 are accumulated and form a clipped histogram as shown in FIG. 8. The number of pixels is accumulated for each gray level up to a low-value maximum, i.e., the histogram is clipped at the low-value maximum. For purposes of comparison, the histogram values of FIG. 4 are sketched in broken lines above the clipped histogram.

Figure 9:
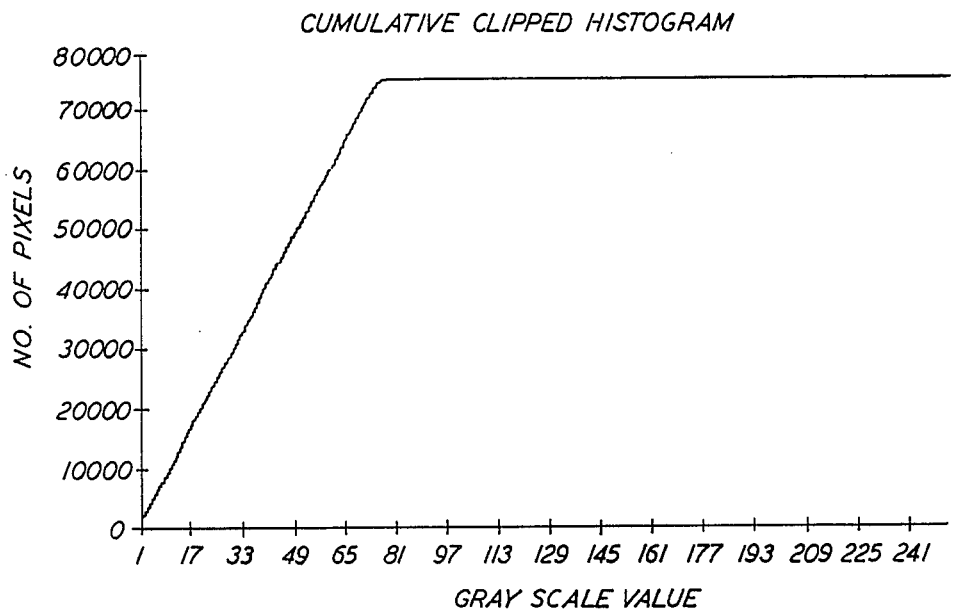
Figure 10:
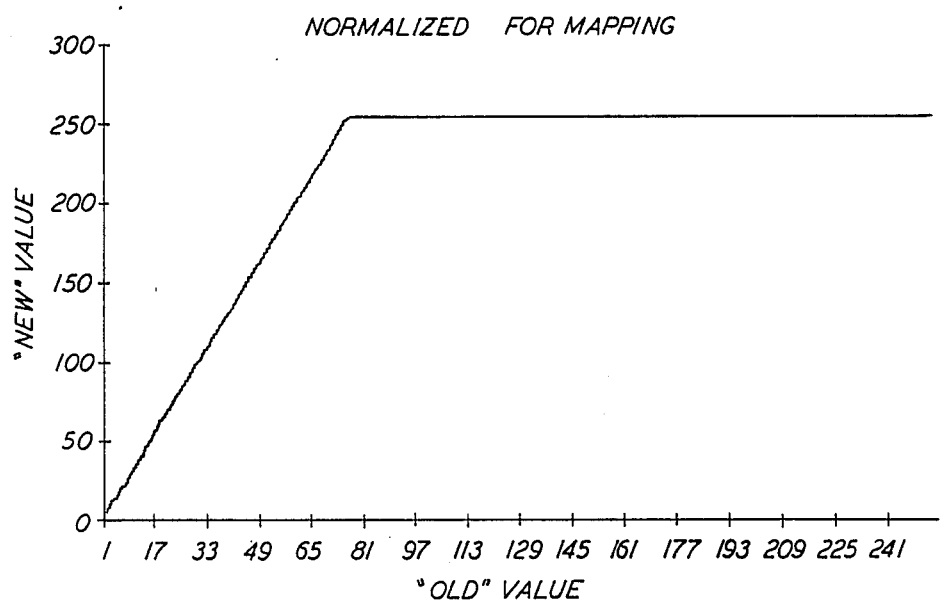
Figure 11:
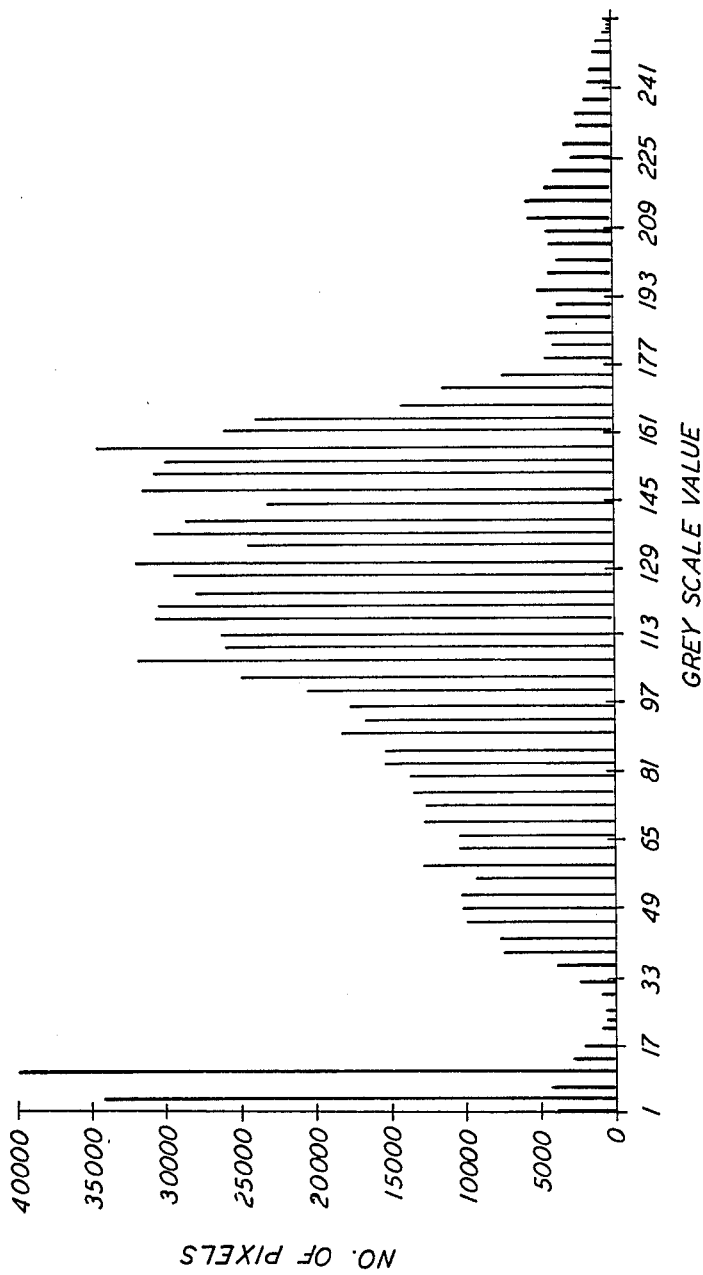

Then, a cumulative histogram is formed from this clipped histogram to provide a more-or-less straight line plot as shown in FIG. 9. The cumulative histogram is formed by storing the sum of the clipped numbers of pixels for all of the values from zero to the respective gray scale value. Then, the histogram of FIG. 9 is normalized to the form shown in FIG. 10, so that the histogram extends throughout a range of zero to two hundred fifty-five on both the ordinate and the abscissa. In this case, the normalized cumulative histogram serves as a transfer function for mapping old or uncorrected digital luminance values (along the abscissa) into new or corrected values (along the ordinate). The new or mapped values have a pixel distribution as illustrated in FIG. 11, which shows a full use f the gray scale. These values produce a reproduced video image as shown, for example, in FIG. 12. This enhanced video image has good contrast at the middle gray values, and also has high detail resolution in the very light and very dark regions as well. The original images contrast relation is preserved through the linear mapping.

It should be understood that the invention is not limited to the example of fluoroscopic imaging, but could be used also for radiography techniques such as digital subtractive angiography, computerized tomography, or other diagnostic techniques.

While the invention has been described in detail with reference to this embodiment, it should be understood that many modifications and variations would present themselves to those of skill in the art without departing from the scope and spirit of this invention, as defined in the appended claims.

What is claimed is:

1. A process of enhancing a still video image to achieve ideal contrast and brightness, comprising dividing the image into a tableau of pixels, each with a respective luminance value along a gray scale from a predetermined minimum to a predetermined maximum; digitizing the pixel luminance values to respective digital pixel values in a range from a predetermined minimum value to a predetermined maximum digital value; forming a histogram distribution of said digital pixel values by storing, for each possible digital pixel value from said predetermined minimum digital value to said predetermined maximum digital value, a number of pixels having said digital pixel value up to a predetermined finite low threshold number, but storing said threshold number if the number of pixels having said digital pixel value exceeds the threshold number; forming a cumulative histogram from said histogram distribution by storing for each said possible digital pixel value the sum of the stored numbers of pixels having values of said histogram distribution less than or equal to said digital pixel value; normalizing said cumulative histogram by adjusting said stored sums by an appropriate factor such that the adjusted stored sums range between zero and a number equal to said maximum digital value; assigning new digital pixel values for said pixels, wherein said new digital pixel values are that adjusted stored sums for the corresponding digital pixel values of the normalized cumulative histogram; and reproducing a visible image from said new digital pixel luminance values, the reproduced image having an optimal luminance distribution over the entire gray scale, with high contrast and superior detail in bright and dark regions of the reproduced image.

2. The process of claim 1 wherein said gray scale consists of digital pixel values form zero to 255.

3. The process of claim 1 wherein said threshold number is selected such that the resulting correspondence between said new digital pixel values and said digital pixel values of said normalized cumulative histogram is approximately linear.

4. The process of claim 1 wherein said still video image is formed by energizing a low-energy x-ray device which radiates low-energy x-rays through a human or veterinary patient onto a fluoroscopic image forming device which produces an image; and forming a video image by directing the image from said fluoroscopic image forming device to a high-resolution video camera.

5. Digital fluoroscopy apparatus that comprises:
an x-ray tube;
an imager responsive to radiation from said x-ray tube to produce a visible image;
a video camera directed at the visible image which produces a still video image comprising a tableau of pixels each having a luminance value along a gray scale between zero and a maximum value;
a patient-positioning stage for positioning a human or veterinary patient between the x-ray tube and the imager;
an imaging computer device which converts the pixel luminance values to respective digital pixel values between zero and a maximum digital pixel value, and corrects and digital pixel values to correspond to a corrected image having corrected digital pixel values distributed over said gray scale; and
means for reproducing a visible image from said corrected digital values having high contrast and superior detail in bright and dark areas; wherein said imaging computer device comprises means for forming a histogram distribution of said digital pixel values, including means for storing, for each possible digital pixel value from zero to said maximum digital value, a number of pixels having said digital pixel value up to a predetermined low finite number of pixels, but storing said low finite number if the number of pixels having said digital pixel value exceeds the low finite number; means forming a cumulative histogram from said histogram distribution including means for storing, for each said possible digital pixel value of said histogram distribution the sum of the stored numbers of pixels having values less than or equal to said digital pixel value; means for normalizing said cumulative histogram by adjusting said stored sums by an appropriate factor such that the adjusted stored sums range between zero and a number substantially equal to said maximum digital value; and means for assigning new digital pixel values for said pixels, wherein said new digital pixel values are the adjusted stored sums for the corresponding digital pixel values of the normalized cumulative histogram.

* * * * *

UNITED STATES PATENT AND TRADEMARK OFFICE
CERTIFICATE OF CORRECTION

PATENT NO. : 4,868,651

DATED : September 19, 1989

INVENTOR(S) : CHOU et al.

It is certified that error appears in the above—identified patent and that said Letters Patent is hereby corrected as shown below:

Col. 5, line 61, "that" should read --the--.

Col. 6, line 6, "form" should read --from--.

Signed and Sealed this

Third Day of March, 1992

Attest:

HARRY F. MANBECK, JR.

Attesting Officer

Commissioner of Patents and Trademarks